(12) United States Patent
May (10) Patent No.: US 7,440,052 B2
(45) Date of Patent: Oct. 21, 2008

(54) OPTICAL DEVICE WITH LIGHT ATTENUATION AND GAIN

(75) Inventor: Gregory J. May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/352,718

(22) Filed: Feb. 13, 2006

(65) Prior Publication Data

US 2007/0188849 A1    Aug. 16, 2007

(51) Int. Cl.
*G02F 1/1335* (2006.01)
(52) U.S. Cl. .......................... 349/113; 349/64
(58) Field of Classification Search .................. 359/15, 359/333; 349/5, 64, 113
See application file for complete search history.

(56) References Cited

U.S. PATENT DOCUMENTS

| | | | |
|---|---|---|---|
| 5,046,793 A * | 9/1991 | Hockley et al. ............. 359/599 |
| 5,140,447 A * | 8/1992 | Kaneko et al. ................ 349/20 |
| 5,210,641 A | 5/1993 | Lewis | |
| 5,396,355 A * | 3/1995 | Wada et al. .................. 349/117 |
| 5,418,631 A | 5/1995 | Tedesco | |
| 5,471,327 A | 11/1995 | Tedesco et al. | |
| 5,534,386 A * | 7/1996 | Petersen et al. ............. 430/320 |
| 5,609,939 A * | 3/1997 | Petersen et al. ............. 428/141 |
| 5,629,996 A | 5/1997 | Rizkin et al. | |
| 5,659,408 A * | 8/1997 | Wenyon ...................... 359/15 |
| 5,709,463 A | 1/1998 | Igram | |
| 5,808,759 A | 9/1998 | Okamori et al. | |
| 5,861,990 A * | 1/1999 | Tedesco ...................... 359/599 |
| 5,936,751 A | 8/1999 | Wenyon | |
| 5,997,150 A | 12/1999 | Anderson | |
| 6,100,952 A | 8/2000 | Marvin et al. | |
| 6,124,954 A | 9/2000 | Popovich et al. | |
| 6,157,474 A | 12/2000 | Orr et al. | |
| 6,474,839 B1 | 11/2002 | Hutchison | |
| 6,509,982 B2 | 1/2003 | Steiner | |
| 6,765,550 B2 * | 7/2004 | Janick et al. ................... 345/87 |
| 6,900,941 B2 * | 5/2005 | Kaminsky et al. ............ 359/599 |
| 2004/0052659 A1 * | 3/2004 | Kim ........................... 417/363 |
| 2004/0085611 A1 * | 5/2004 | Minoura et al. ............. 359/263 |
| 2004/0136038 A1 * | 7/2004 | Holmes et al. ................ 359/15 |
| 2005/0270604 A1 * | 12/2005 | Drinkwater .................... 359/2 |

FOREIGN PATENT DOCUMENTS

JP    2005/107011 A    4/2005

OTHER PUBLICATIONS

Jackson, J.D., Classical Electrodynamics, 2nd Ed., Wiley, New York, (1975), pp. 278-282.*
Huang et al. "Application of multidirectional asymmetrical microlens-array light-control films on reflective liquid-crystal displays for image quality enhancement", Applied Optics, vol. 43, No. 18, pp. 3656-3663(Jun. 20, 2004).*
POC Physical Optics Corporation, LSD Light Shaping Diffuser, printed Nov. 21, 2005 from Internet, www.poc.com/lsd.

(Continued)

*Primary Examiner*—Eric Bolda (57) ABSTRACT

Various embodiments and methods relating to an optical device in which light is attenuated and in which gain is applied to light are disclosed.

13 Claims, 4 Drawing Sheets

OTHER PUBLICATIONS

POC Physical Optics Corporation, DTF Directional Turning Film, printed Nov. 21, 2005 from Internet, www.poc.com/lsd.

POC Physical Optics Corporation, How Holographic LSDs Work, printed Nov. 21, 2005 from Internet, www.poc.com/lsd.

POC Physical Optics Corporation, DDS Directional Display Screen-Rear Projection, printed Nov. 21, 2005 from Internet, www.poc.com/lsd.

* cited by examiner

OPTICAL DEVICE WITH LIGHT ATTENUATION AND GAIN

BACKGROUND

Optical devices, such as screens and displays, may operate by reflecting light. In many instances, more than one source of light may be presented. In such cases, the optical device may reflect light from an undesirable light source, potentially reducing the quality of an image provided by the reflected light.

DETAILED DESCRIPTION OF EXAMPLE EMBODIMENTS

Figure 1:
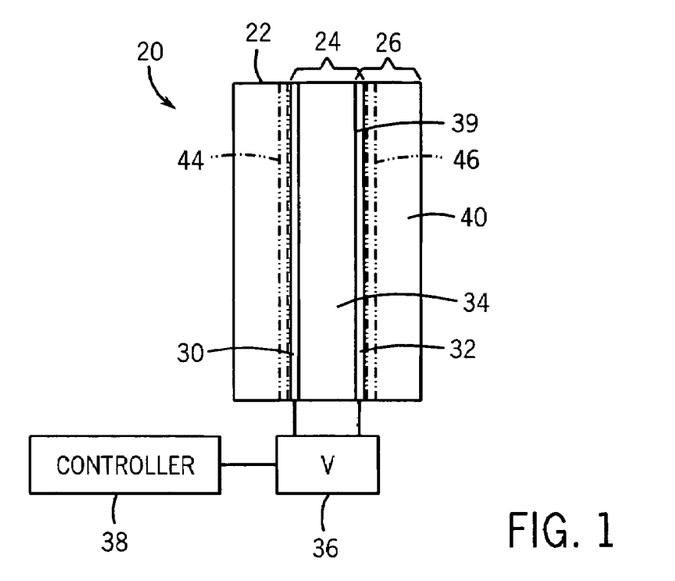
FIG. 1 is a sectional view schematically illustrating one example of an optical device according to an example embodiment.

FIG. 1 schematically illustrates one example of an optical device 20 configured to selectively attenuate, reflect and apply gain to light that may originate from more than one source. In particular embodiments, optical device 20 may reduce light reflected from undesirable sources of light while enhancing the brightness of the reflected light originating from the desired sources. In one embodiment, optical device 20 may serve as a screen, wherein image data may be carried by light projected at optical device 20. In another embodiment, optical device may serve as a display, wherein image data is provided by optical device 20 itself.

As shown by FIG. 1, optical device 20 generally includes front attenuator 22, modulator 24 and gain reflector 26. Front attenuator 22 constitutes one or more layers of one or more materials configured to non-uniformly attenuate light based upon the angles of incidence of the light with attenuator 22. For example, in one embodiment, attenuator 22 may be configured to block light emanating from a first source and impinging attenuator 22 at a first angle to a first extent while blocking or accepting light emanating from a second source and impinging attenuator 22 at a second angle to a second greater or lesser extent. In this manner, attenuator 22 may lessen reflection of light by gain reflector 26 of optical device 20 from undesirable sources of light while increasing the reflection of light from desired sources.

In one embodiment, attenuator 22 may include one or more layers of materials having different densities or different degrees of darkness so as to differently attenuate incident light having different angles of incidence. In yet another embodiment, attenuator 22 may constitute a privacy glass or privacy filter such as the privacy glass commercially available from 3M under the trade name VIKUITI. In still other embodiments, attenuator 22 may include other materials or have other configurations so as to differently attenuate light based upon the angles of incidence of such light.

Modulator 24 may constitute one or more layers or structures of one or more materials configured to change between different states in which different levels of light are transmitted through modulator 24. In the particular embodiment illustrated, modulator 24 includes conductors 30, 32 and charge responsive optical material layer 34. Conductors 30 and 32 constitute one or more layers of electrically conductive material configured to cooperate with one another so as to create an electrical field across layer 34. In one embodiment, layer 30 includes one or more transparent electrically conductive materials so as to transmit light. For example, in one embodiment, layer 30 may be formed from polyethylene dioxythiophene (PEDOT) or indium tin oxide. In other embodiments, layer 30 may be formed from other transparent electrically conductive materials.

Layer 32 is on an opposite side of layer 34 as layer 30. In the particular embodiment illustrated, layer 32 is also configured as part of gain reflector 26. In the particular embodiment shown in FIG. 1, layer 32 is formed from a highly reflective electrically conductive material such that layer 32 additionally facilitates reflection of light by gain reflector 26. Because layer 32 provides electrical conduction for modulator 24 and reflection for gain reflector 26, device 20 may be thinner and less complex. In one such embodiment, layer 32 may be formed from aluminum. In other embodiments, layer 32 may be formed from other reflective, electrically conductive materials. In still other embodiments, layer 32 may alternatively be formed from an electrically conductive transparent material, potentially the same as that of layer 30, wherein gain reflector 26 includes a separate reflective surface.

Layer 34 constitutes one or more layers of charge responsive optical material disposed or sandwiched between layers 30 and 32. The charge responsive materials of layer 34 are configured to change between different transmissivity or attenuation states in response to different electrical fields applied across layer 34. In one embodiment, layer 34, depending upon the electrical field applied across layer 34, attenuates light to substantially the same degree irrespective of the angle of incidence of such light. In one embodiment, layer 34 may be formed from a polymer dispersed liquid crystal (PDLC). In one embodiment, the PDLC may be dyed to a dark color, such as black, such that modulator 24 absorbs substantially all visible light in the absence of an applied electric field and transmits visible light to at least some degree in the presence of an electric field. In still other embodiments, layer 34 may include other materials, such as other liquid crystal compositions, configured to change between different light transmissive states. In one embodiment, modulator 24 may comprise a liquid crystal display in which layer 34 comprises multiple liquid crystal cells and in which layers 30 and 32 comprise conductive layers. In such an embodiment, modulator 24 may additionally include multiple color filters such as red, green and blue filters which form individual pixels.

Although optical device 20 is illustrated as including modulator 24 sandwiched between attenuator 22 and gain reflector 26, in other embodiments, modulator 24 may be omitted. For example, in other embodiments, optical device 20 may merely include attenuator 22 and gain reflector 26, omitting layers 34 and 30. In such an embodiment, conductor 32 may be formed from other conductive or nonconductive reflective materials.

Gain reflector 26 constitutes one or more layers or one or more structures configured to reflect and apply gain to incident light that has passed through attenuator 22 and modulator 24. In particular embodiments, gain reflector 26 may additionally be configured to steer a direction of light reflected from reflector 26. In one embodiment, gain reflector 26 applies gain to light being reflected so as to compensate for diffusion of light through layer 34, which occurs twice—once before being reflected by reflector 26 and once after being reflected by gain reflector 26. In one embodiment, gain reflector 26 is further configured to apply gain to compensate for undesired attenuation of light by attenuator 22.

According to the example shown in FIG. 1, gain reflector 26 constitutes a holographic diffuser 40, the front face of which is coated with reflective conductor 32. In such an embodiment, conductor 32 is shaped in part by holographic diffuser 40 so as to be dimpled to provide multiple differently angled mirrors configured to provide gain while providing a sufficiently wide viewing angle or viewing cone. In one embodiment, holographic diffuser 40 may constitute a holographic diffuser commercially available from Physical Optics Corporation of Torrance, Calif. In other embodiments, holographic diffuser 40 may constitute other holographic diffusion structures.

As shown in phantom in FIG. 1, as noted above, in the particular embodiment shown in FIG. 1, conductor 32 serves functions for both modulator 24 and gain reflector 26. Conductor 32 serves to conduct electrical charge for modulator 24 while reflecting light for reflector 26. In one embodiment, conductor 32 may be formed from a highly reflective material, such as a highly reflective metal, such as aluminum, so as to reflect substantially all visible light. In yet another embodiment, conductor 32 may be formed from a material that is inherently substantially white or may be coated with a white material so as to substantially reflect all visible light. In such embodiments where conductor 32 is configured to reflect substantially all visible light, optical device may be well suited for reflecting light from a projector or other light source providing light corresponding to image data. In yet other embodiments, conductor 32 may be configured to reflect other non-visible light as well such as infrared light and ultraviolet light.

In yet other embodiments in which optical device 20 is part of a display, conductor 32 may have an image printed or otherwise formed upon it. For example, in one embodiment, one or more images such as graphics, alphanumeric symbols and the like may be coated or otherwise formed upon conductor 32. In such an embodiment, conductor 32 may absorb certain wavelengths of light while reflecting other wavelengths of light that have passed through attenuator 26 and modulator 24 to provide a color or black and white image. In one embodiment, conductor 32 may include multiple reflective pixels having colors such as red, green and blue that can be combined to produce other colors, wherein modulator 24 selectively permits light to impinge the individual red, green and blue pixels provided by conductor 32 to provide color images. In still other embodiments, conductor 32 may not be conductive such as when modulator 24 is omitted or a separate conductor for modulator 24 is provided.

In other embodiments, conductor 32 may alternatively comprise a substantially transparent or translucent electric conductive layer, wherein gain reflector 26 includes an alternative reflective layer. The alternative reflective layer may comprise a metal layer such as aluminum or may comprise a non-metal colored surface or layer 46. Although layer 46 is illustrated as being formed between conductor 32 and holographic diffuser 40, in other embodiments, the reflective layer 46 may alternatively be formed upon a rear side of holographic diffuser 40 or upon a front side of conductor 32.

In yet other embodiments, optical device 20 may alternatively provide images as part of a display by additionally including one or more color light filters between a reflective surface of gain reflector 26 and the front of optical modulator 20. For example, in one embodiment, optical device 20 may additionally include a color filter layer 44 (shown in phantom), wherein the filter layer 44 functions as a black and white or colored transparency, filtering different wavelengths of light such that light reflected from optical device 20 has a desired image. In one embodiment, color filter layer 44 may be provided by a Fabry-Perot device having appropriately spaced partial reflective layers, whereby refraction of light passing through such layers filters selected wavelengths of visible light. Although layer 44 is illustrated as being between attenuator 22 and modulator 24, in other embodiments, layer 44 may have other locations between a reflective portion of reflector 26 and a front of optical device 20. In one embodiment, layer 44 may be provided at the front of optical device 20. In still other embodiments in which optical device 20 is part of a screen or in which conductor 32 or another reflective surface of reflector 26 forms an image, filter 44 may be omitted.

Voltage source 36 constitutes a source of voltage for forming an electric field across layer 34. In those embodiments in which layer 34 includes a PDLC material, voltage source 36 is configured to supply an alternating field or alternating charge across layer 34 via conductors 30 and 32. In other embodiments in which layer 34 includes other charge responsive optical materials, voltage source 36 may be configured to supply a direct non-alternating charge.

Controller 38 constitutes a processing unit configured to generate control signals directing supply of charge to conductors 30 and 32 from voltage source 36. For purposes of this disclosure, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 38 is not limited to any specific combination of hardware circuitry and software, nor to any particular source for the instructions executed by the processing unit.

In operation, controller 38 generates control signals to control the electric field applied across layer 34 by conductors 30 and 32. By varying the electric field applied across layer 34, controller 38 also varies and controls the extent to which transmission of light across layer 34 is attenuated. In one embodiment, controller 38 is configured to generate control signals directing the operation of voltage source 36 such that layer 34 may be changed between a substantially opaque state in which substantially all visible light is attenuated, a substantially clear state in which substantially all visible light is transmitted and one or more intermediate states in which a percentage of light is transmitted and a percentage of light is attenuated or blocked. By controlling a level of attenuation provided by layer 34, controller 38 may adjust optical device 20 to accommodate different circumstances such as different environmental or ambient lighting conditions.

Overall, attenuator 22, modulator 24 and gain reflector 26 of optical device 20 reduce reflection of light emanating from undesirable light sources while at least substantially uniformly attenuating the transmission of light to the desired extent from desired light sources and reflecting such light with the desired amount of gain to at least partially compensate for loss of brightness or light intensity. Attenuator 22 and gain reflector 26 cooperate with one another such that loss of light intensity from desirable light sources at attenuator 22 is compensated for by gain provided by gain reflector 26. In one embodiment, gain reflector 26 additionally compensates for loss of light caused by diffusion through modulator 24. Such cooperation between attenuator 22, and gain reflector 26 of optical device 20 enhances image quality and contrast in displays and screens by reducing the effect of light from selected light sources.

Figure 2:
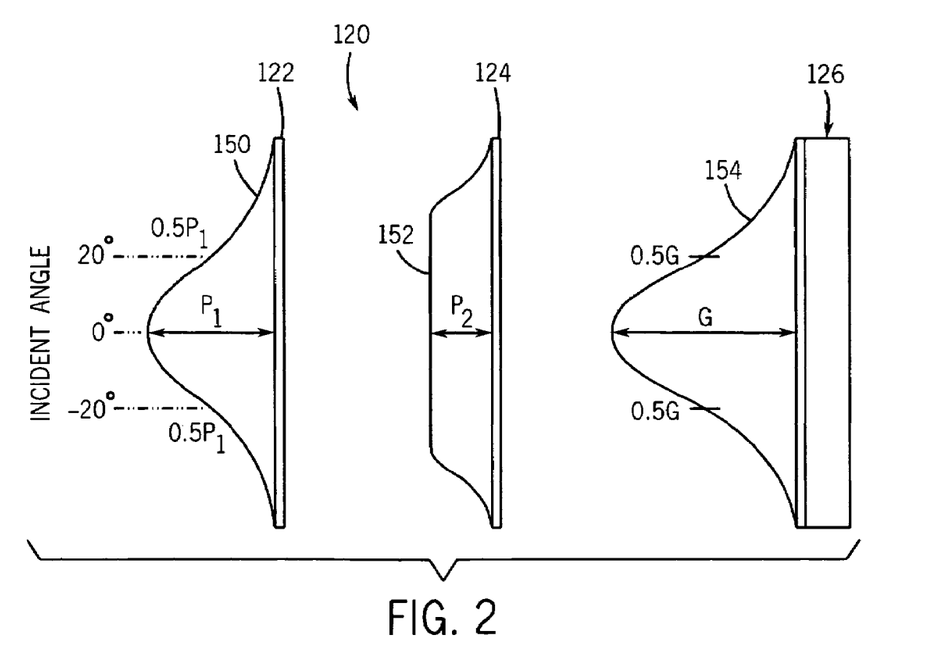
FIG. 2 is an exploded sectional view from a side of the optical device of FIG. 1 with superimposed graphs illustrating the treatment of light by portions of the optical device according to an example embodiment.

FIGS. 2-7 illustrate various embodiments of optical device 20. FIG. 2 is an exploded sectional view of optical device 120, one embodiment of optical device 20 with graphs superimposed thereon and illustrating treatment of light by portions of optical device 120. Optical device 120 includes front attenuator 122, modulator 124 and gain reflector 126. Front attenuator 122 constitutes one example configuration of front attenuator 22. As shown by the superimposed graph, front attenuator 122 is configured to non-uniformly attenuate light based upon the angles of incidence of such light upon attenuator 122. In the particular example illustrated, attenuator non-uniformly attenuates light symmetrically with respect to a normal (0°) angle of incidence. In the particular example illustrated, attenuator 122 has a 40° Full Width Half Max (FWHM) attenuation. In other words, attenuator 22 will transmit the largest or maximum fraction of light $P_1$ that has a normal or perpendicular angle of incidence (0°) with respect to attenuator 122. At the same time, attenuator 22 will transmit 50% of light that has an angle of incident of 20° or negative 20° with respect to normal (0°) with attenuator 122. As the angle of incidence of such light with respect to front attenuator 122 grows, the percentage of light attenuated by attenuator 122 increases.

As illustrated by the superimposed graph, modulator 124 in a substantially clear transmissive state still diffuses light that has been transmitted past front attenuator 122. As a result, the viewing angle of such light is enlarged after passing through modulator 124 while the brightness or intensity of such light is reduced. As shown in FIG. 2. In the example illustrated, modulator 124 is less angle dependant in that the degree to which light is attenuated by modulator 124 is less affected by the angle of incidence of such light. In the example shown on FIG. 2, modulator 124 transmits a peak fraction of light $P_2$.

As illustrated by the third superimposed graph 154, gain reflector 126 is configured to reflect light that is passed through modulator 124 and to provide such reflected light with gain. In other words, reflector 126 narrows the viewing angle of the reflected light to increase its intensity or brightness at tighter angles. As shown in FIG. 2, gain reflector 126 increases the brightness of light by applying gain G. In the particular example shown, gain reflector 126 applies gain to incident light based upon the angle of incidence of such light. In the particular example illustrated, gain reflector 126 applies the largest amount of gain G to light that is normal or perpendicular to incident light that is normal or perpendicular to gain reflector 126. In one embodiment, reflector 126 applies gain to such light to a degree sufficient to compensate for loss of brightness due to attenuation (P1) by front attenuator 122 and attenuation (P2) of second layer or modulator and inherent diffusion D by modulator 124. For example, in one embodiment in which normal incident light is attenuated such that modulator 124 diffuses light resulting in a single pass loss of light D, gain reflector 126 is configured to provide gain G of at least about $1/(P_1P_2)^2+2D$. In such an embodiment, the resulting reflected light emanating from optical device 122 has at least the same peak brightness as the light entering optical device 120 at an angle of incidence normal to attenuator 122. In other words, gain reflector 126 accounts for such light being attenuated twice by front attenuator 122 (once entering optical device 120 and once exiting optical device 120), twice by modulator 124 (once entering modulator 124 and once exiting modulator 124) and for light being diffused twice by modulator 124 (once during light entering optical device 120 and once during light exiting optical device 120). As a result, optical device 120 more greatly attenuates light emanating from sources above and below device 120 as compared to light emanating from sources more normal or directly opposite to optical device 120. At the same time, optical device 120 at least partially compensates for loss of brightness resulting from attenuator 122 and modulator 124.

Figure 3:
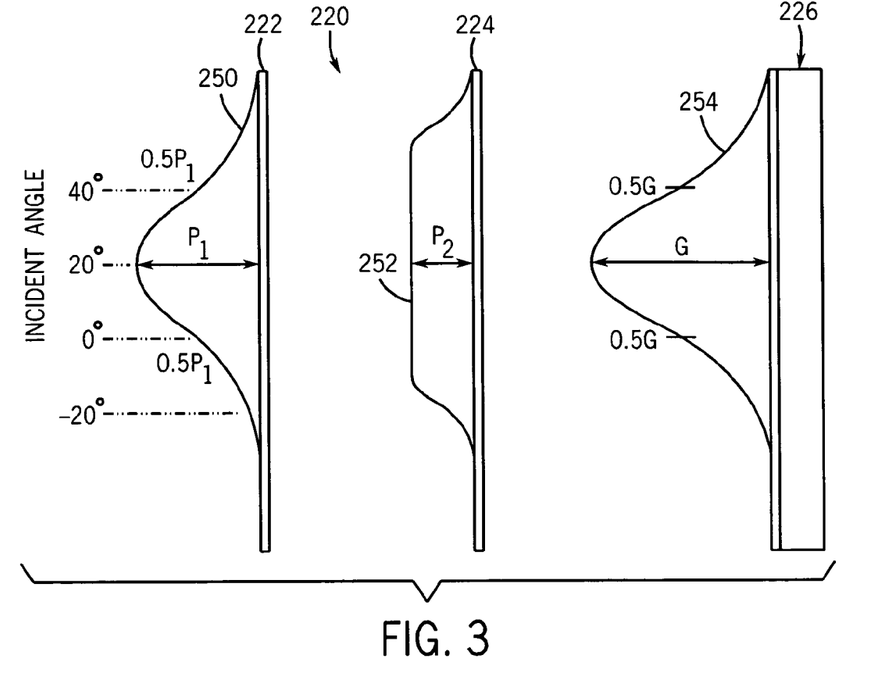
FIG. 3 is an exploded sectional view taken from a side of an optical device of another embodiment of the optical device of FIG. 1 with superimposed graphs illustrating treatment of light by the optical device according to an example embodiment.

FIG. 3 is an exploded sectional view of optical device 220, another embodiment of optical device 20. Optical device 220 includes front attenuator 222, modulator 224 and gain reflector 226 which are example embodiments of front attenuator 22, modulator 24 and gain reflector 26, respectively. As illustrated by the superimposed graph 250 in FIG. 3, front attenuator 222 non-uniformly attenuates light based upon the light angle of incidence with respect to attenuator 222. In other words, front attenuator 222 variably attenuates light based upon the angle of incident of such light with respect to attenuator 222. As further shown by FIG. 3, front attenuator 222 asymmetrically attenuates such light with respect to a normal angle of incidence with attenuator 222. In the particular example shown, front attenuator 222 is configured to provide a 40° Full Width Half Max attenuation but is offset by 20° such that light having angle of incidence of 20° above normal or 0° with respect to attenuator 222 is attenuated the least and has a peak transmitted fraction $P_1$. Likewise, light incident to attenuator 222 that is normal or 0° or light having an incident angle of 40° is attenuated so as to have a transmitted fraction of light that is $0.5P_1$. In the example shown, front attenuator 222 accepts or transmits a greater percentage or fraction of light emanating from sources having a higher angle of incidence as compared to light having a lesser or negative angle of incidence. In other words, in the example shown in which front attenuator 222 is substantially vertical, front attenuator 222 accepts and/or transmits a greater percent of light emanating from light sources that are vertically higher as compared to light sources that are vertically lower.

As illustrated by the superimposed graph 252 in FIG. 3, modulator 224 transmits light that is passed through attenuator 222. When in a transmissive state, modulator 224 still diffuses light passing therethrough. In other words, modulator 224 enlarges the viewing angle or viewing cone of such light while lessening the magnitude of brightness of such light. As shown by FIG. 3, modulator 224 alternates and diffuses light such that light passing through modulator 224 has a peak or maximum light transmission fraction $P_2$.

As indicated by superimposed graph 254 in FIG. 3, gain reflector 226 is configured to reflect light transmitted through modulator 224 and to apply gain G to such light. In one embodiment, reflector 226 is configured such that gain G is at least about $$\frac{1}{(P_1 P_2)^2} + 2D,$$

where P is the fraction of light transmitted by attenuator 222 at positive 20° with respect to normal (P2 is the fraction of light transmitted by attenuator 224 at positive 20° with respect to normal) and where D is equal to the amount by which light is diffused by modulator 224. In those embodiments where gain reflector 226 has a reflection coefficient of less than 1 (i.e. there's a lost of reflection off of gain reflector 226), gain reflector 226 may alternatively be configured to apply a gain B of $1/((P_1 P_2)^2 R)+2D$, were R is the reflection coefficient of gain reflector 226. As further shown by FIG. 3, gain reflector 226 is further configured to asymmetrically apply gain to light with respect to a normal angle of incidence of such light. In the particular example illustrated, reflector 226 asymmetrically applies gain to light based upon the asymmetric attenuation of light by attenuator 222. In the example illustrated in which attenuator 222 transmits the greatest percentage of incident light at a positive 20° incident angle with respect to normal, gain reflector 226 also applies the greatest amount of gain to the same light having a positive 20° incident angle with respect to normal. In the example shown, gain reflector 226 applies a lesser amount of gain G to light as the angle of incidence of such light is greater than or less than the offset of attenuator 222.

The resulting optical device 220 attenuates light emanating from sources less than 20° above the horizontal to a greater extent as compared to light emanating from light sources above 20° above normal or 0° to attenuator 22. Light emanating from sources above 20° above normal or 0° also has a larger gain applied thereto as compared to light emanating from sources below the horizontal or normal to attenuator 22. The additional gain applied to light emanating from sources above 0° or normal compensates for undesirable attenuation of such light after it is reflected off of reflector 226 at an equal and opposite angle and is passed through attenuator 222 where it is undesirably attenuated to a greater degree. For example, light emanating from a desired source and impinging upon attenuator 222 at an angle of incidence of 20° will have the smallest degree of attenuation by attenuator 222. However, the light will reflect off of reflector 226 and pass attenuator 222 at a negative 20° where a substantial portion of the light may be attenuated. Gain reflector 226 compensates for the undesirable attenuation of this light as it passes through attenuator 222 a second time by adding gain to such light. In such a manner, optical device 220 may selectively attenuate light from particular sources while accepting and reflecting light from other sources without substantial loss of brightness of the light emanating from the desired light source.

Figure 4:
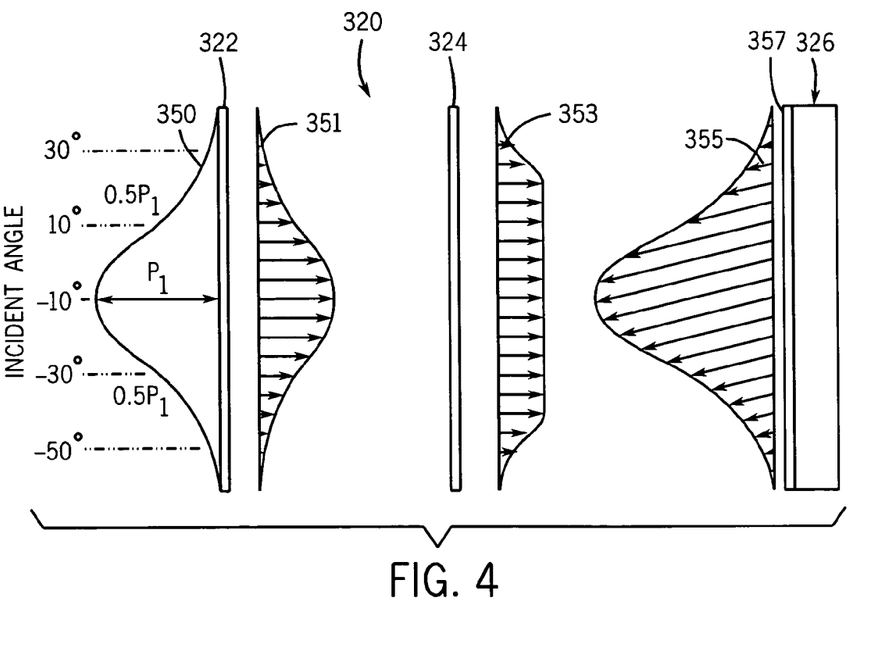
FIG. 4 is an exploded sectional view taken from a side of another embodiment of the optical device of FIG. 1 with superimposed graphs and arrows illustrating treatment of light by the optical device according to an example embodiment.

FIG. 4 is an exploded sectional view of optical device 320, another embodiment of optical device 20. Optical device 320 includes front attenuator 322, modulator 324 and gain reflector 326, particular embodiments of front attenuator 22, modulator 24 and gain reflector 26, respectively. As illustrated by the superimposed graph 350 in FIG. 4, front attenuator 322 is configured to non-uniformly attenuate light based upon incident angles of such light. In the particular example shown, front attenuator 322 is configured to asymmetrically attenuate light with respect to a normal or perpendicular angle of incidence (shown as 0°). In the particular example illustrated, attenuator 322 is configured to provide the greatest level of light transmission $P_1$ from normal or 0° to negative 20° with respect to normal. Attenuator 320 is further configured to transmit 50% of $P_1$ of such light having angles of incidence with attenuator 322 at 10° above horizontal or 30° below horizontal or normal. As graphically illustrated by the arrows to the right of attenuator 322, the length of which represents the brightness or amount of light transmitted, front attenuator 322 transmits a greater portion of light emanating from sources below horizontal as compared to above horizontal or 0°. In other words, front attenuator 322 is more adapt to reject light from higher sources as compared to lower sources.

As illustrated by superimposed graph 353 in which lengths of arrows schematically represent brightness of light being transmitted, modulator 324 diffuses light that is transmitted by attenuator 322. In other words, modulator 324 enlarges the viewing angle or viewing cone of such light while lessening the intensity or brightness of the light (as indicated by the arrows having a greater vertical extent but shorter individual lengths). As schematically illustrated by superimposed arrows 355 in which the vertical extent of such arrows represents the viewing angle of light, in which the individual lengths of such arrows represent the brightness as a result of applied gain and in which the direction of arrows represents the direction in which light is reflected, gain reflector 326 reflects light while applying gain to such light and steering such light.

In the example illustrated, gain reflector 326 asymmetrically applies gain to light being reflected corresponding to the asymmetric attenuation of light by front attenuator 322. Reflector 326 applies a sufficient amount of gain to such light to at least partially compensate for brightness of light that may be lost due to diffusion by modulator 324 and due to undesirable attenuation by attenuator 322. For example, light emanating from a desired source and impinging attenuator 322 with an incident angle of negative 10° will be reflected by gain reflector 326 and will exit through attenuator 322 at a positive 10° where 50% of such light will undesirably be attenuated. To compensate for this undesirable attenuation of light from a desired light source, gain reflector 326 is configured to asymmetrically apply gain to such light to compensate for this loss of brightness. In one embodiment, gain reflector 326 is configured to apply a gain of at least 2 to such light. In one embodiment, gain reflector 326 may provide additional gain to compensate for the amount of brightness lost as a result of such light being diffused as light passes through modulator 324 twice.

Figure 5:
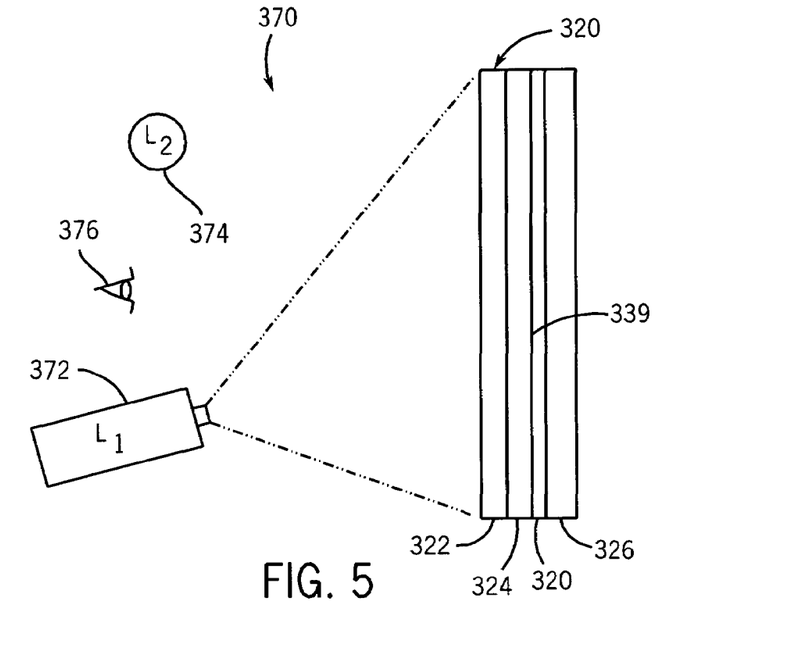
FIG. 5 is a schematic illustration of one example of an optical system including the optical device of FIG. 4 according to an example embodiment.

FIG. 5 schematically illustrates an optical system 370 including optical device 320. As shown by FIG. 5, optical system 370 includes a desired light source 372 and an undesirable light source 374. The desired light source 372 may constitute a source of desired light such as light from a projector as when optical device 320 is incorporated as part of a screen or such as light from a sign or display illumination source. Light source 374 may constitute an undesired light source such as undesirable ambient light through a window or from an overhead light source or from the sun. In the particular example shown in FIG. 5, light source 372 is located below the horizontal while light source 374 is located above the horizontal. A desired observer for system 370 is substantially at horizontal such that the observer's line of sight to device 320 is substantially perpendicular or normal to device 320. As described above with respect to FIG. 4, optical device 320 is configured to accept and transmit a greater percentage of light from the desired light source 372 which is below horizontal as compared to the undesired light source 374 which is above horizontal. Depending upon the overall desired brightness of the image and ambient lighting conditions, modulator 324 may be changed between different light transmissive states so as to at least substantially uniformly attenuate transmission of light to different extents to gain reflector 326. As further described above with respect to FIG. 4, gain reflector 326 reflects such light back through modulator 324 and through attenuator 322. The reflective surface 357 of reflector 326 serves as an imaging surface for the observer 376.

Because gain reflector 326 applies gain to light to compensate for inherent attenuation and diffusion of light by modulator 324 and undesirable attenuation of light from source 372 by attenuator 322, the image quality as observed by observer 376 is enhanced. Because gain reflector 326 further steers the light being reflected (schematically illustrated by the downwardly pointed arrows 355 of FIG. 4), light reflected from light source 372 is reflected back towards observer 376 at a lower angle such that a lower percentage of such light will be undesirably attenuated as it passes through attenuator 322. In addition, the observer 376 is more likely to be within the viewing angle or viewing cone of the light being reflected.

Figure 6:
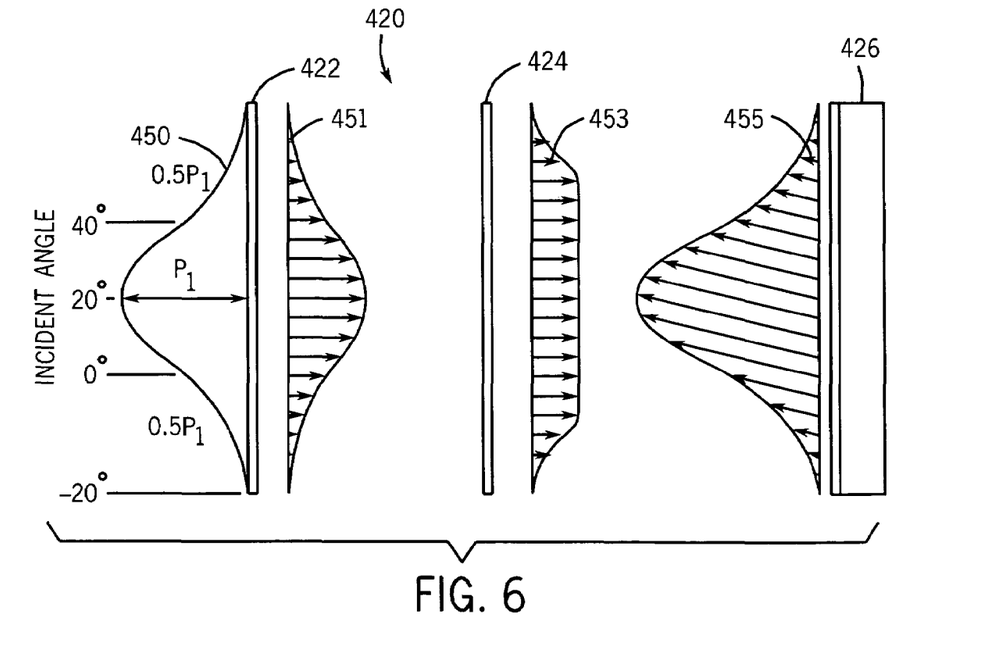
FIG. 6 is an exploded sectional view taken from a side of another embodiment of the optical device of FIG. 1 with superimposed graphs and arrows illustrating treatment of light by the optical device according to an example embodiment.

FIG. 6 is an exploded sectional view of optical device 420, another embodiment of optical device 20. Optical device 420 includes front attenuator 422, modulator 424 and gain reflector 426, example embodiments of front attenuator 22, modulator 24 and gain reflector 26, respectively (shown in FIG. 1). As illustrated by superimposed graph 450, front attenuator 322 is configured to non-uniformly attenuate light based upon the angle of incidence of such light with respect to attenuator 422. As further shown by FIG. 6, in the example illustrated, attenuator 422 is configured to asymmetrically attenuate light with respect to a normal angle of incidence with respect to attenuator 422 (0° in graph 450). In the particular example illustrated in FIG. 6, attenuator 422 has a 40° Full Width Half Max attenuation that is offset 20° above normal. In other words, attenuator 422 is configured to have a peak light transmission fraction $P_1$ for light impinging attenuator 422 at a 20° angle with respect to normal (0°). Light having an angle of incidence of 40° above normal or at 0° (perpendicular to attenuator 422) will have a light transmission fraction $0.5P_1$. As schematically represented by arrows 451 in which the horizontal length such as represents the brightness of transmitted light, attenuator 422 transmits a greater percentage of light emanating from sources above horizontal as compared to sources below horizontal.

As schematically illustrated by superimposed arrows 453, modulator 424, in the light transmitting state, transmits and diffuses light. In particular, modulator 424 increases the viewing angle or viewing cone of the light while lessening the brightness of the light as indicated by the shorter length of the arrows 453 as compared to arrows 451.

As schematically illustrated by superimposed arrows 455, gain reflector 426 reflects light 453 and non-uniformly applies gain to such reflected light. As further shown by FIG. 6, gain reflector 426 asymmetrically applies gain to reflected light with respect to a normal angle of incidence. In the particular example illustrated, gain reflector 426 asymmetrically applies gain to reflected light based upon the asymmetric attenuation of light by attenuator 422. In the example shown, attenuator 422 is configured to transmit the greater percentage of light emanating from light sources from above the horizontal such that light from such desired light sources has an incidence angle of greater than 0°. Likewise, gain reflector 426 is also configured to apply a greater amount of gain to light originally emanating from the same desired light sources above the horizontal and having positive incidence angles as compared to light emanating from light sources below the horizontal and having smaller or even negative incidence angles. Because asymmetric application of gain by gain reflector 426 is coordinated with asymmetric attenuation of light by attenuator 422, gain reflector 426 enhances the resulting brightness of reflected light that originally emanated from the desired light sources.

As further shown by FIG. 6, gain reflector 426 further steers light being reflected. In one embodiment, gain reflector 426 may be configured as a combination of a light shaping diffuser and to Fresnel/prism beam shifting structure to create a directional turning film that creates off-axis images and illumination. For example, in one embodiment, gain reflector 426 may comprise a directional turning film such as commercially available from Physical Optics Corporation of Torrance, Calif. In the particular example illustrated, gain reflector 426 steers reflected light in an upward direction as seen in FIG. 6. As a result, light reflected from optical device 420 may be directed more towards the expected location of observers and undesirable attenuation of light emanating from desired sources as it exits through attenuator 422 may be reduced.

Figure 7:
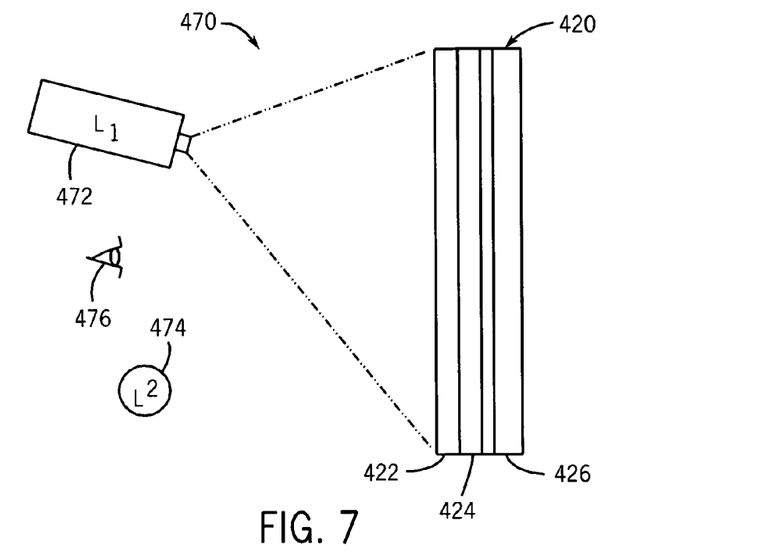
FIG. 7 is a schematic illustration of another embodiment of the optical system of FIG. 5 including the optical device of FIG. 6 according to an example embodiment.

FIG. 7 illustrates one example of an optical system 470 including optical device 420. Optical system 470 additionally includes a desired light source 472 and an undesirable light source 474. Light source 472 may constitute a desired source of light such as a spotlight, sunlight or light through a window such as when optical device 420 constitutes a reflective sign or display. In another embodiment, light source 472 may constitute a desired source of light such as a projector such as when optical device 420 is a screen. In the particular example shown, light source 472 is positioned above horizontal such that light from source 472 impinges optical device 420 with a positive angle of incidence.

Light source 474 transmits an undesirable light source in that light emanating from light source 474 generally does not substantially enhance the quality of the image provided by optical device 420. Examples of light source 474 may include ambient light such as light coming through windows as in the case of an indoor projection system or indoor display or light coming from vehicles such as roadside signs and the like. As noted above, optical device 420 will more greatly attenuate light emanating from below horizontal, such as light from light source 474 as compared to light emanating from the above the horizontal such as light source 472. Modulator 424 will at least substantially uniformly attenuate such light depending upon environmental or other conditions. Gain reflector 426 asymmetrically applies gain to light such that more gain is applied to light emanating from light source 472 as compared to light source 474. Because optical device 420 additionally steers reflected light, light emanating from light source 472 is directed at an observer 476 (presumed to be at horizontal or normal to optical device 420).

Figure 8:
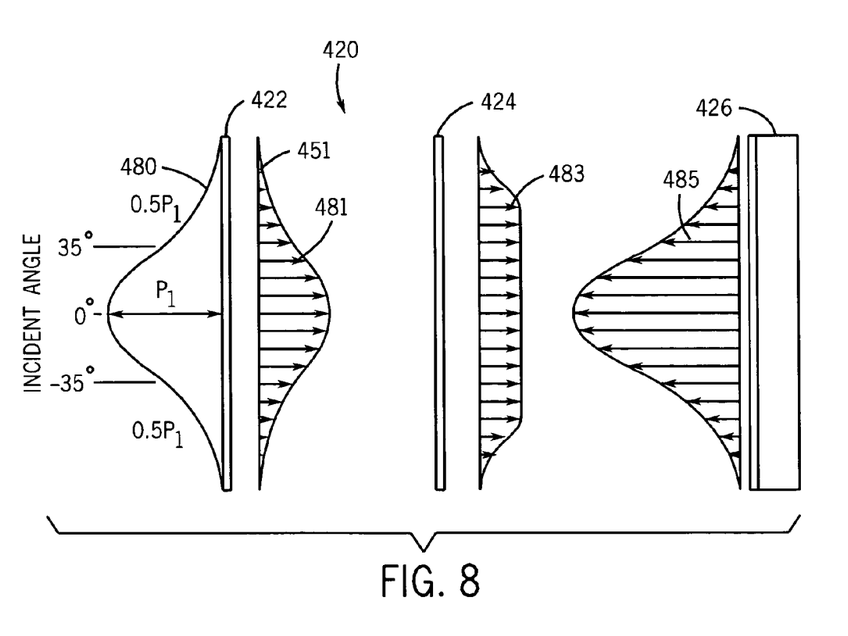
FIG. 8 is an exploded sectional view of the optical device of FIG. 6 taken from a top of the optical device with superimposed graphs and arrows illustrating treatment of light by the optical device according to an example embodiment.

FIG. 8 is an exploded sectional view of optical device 420 taken along a line substantially perpendicular to the line at which FIG. 6 is taken. FIG. 8 illustrates the attenuation, reflection and application of gain to light in a horizontal direction rather than a vertical direction as seen in FIG. 6. As illustrated by superimposed graph 480, attenuator 422 is further configured to non-uniformly attenuate light based upon the angle of incidence of such light with respect to a vertical plane that is normal to attenuator 422 (illustrated on the graph as 0°). In the particular embodiment illustrated, attenuator 422 is configured to symmetrically attenuate light with respect to the vertical normal plane or axis. In the particular example illustrated, attenuator 422 has a 70° Full Width Half Max attenuation of light centered at the normal angle of incidence. As illustrated by superimposed arrows 481, wherein the length of such arrows schematically represents the intensity or brightness of the light, light transmitted by attenuator 422 having a horizontal incident angle that is normal to attenuator 422 has the strongest brightness. As shown by FIG. 8, light emanating from sources to the extreme sides of optical device 422 is strongly attenuated. In particular environments, attenuator 422 may serve to strongly attenuate unwanted ambient light from windows or other light sources.

As schematically illustrated by arrows 483, optical modulator 424, in a transmissive state, inherently diffuses light before passing such light to gain reflector 426. As schematically indicated by superimposed arrows 485, gain reflector 426 selects and applies gain to light. In the particular example illustrated, gain reflector 426 supplies a sufficient amount of gain to compensate for loss of light brought about by diffusion of light as it passes through modulator 424 and further caused by undesired attenuation of light as it passes through attenuator 422. As shown by FIG. 8, attenuator 422 and gain reflector 426 are configured to attenuate and apply gain to light differently along the horizontal axis shown in FIG. 8 as compared to the vertical axis shown in FIG. 6. As a result, optical device 20 may further be customized to selectively accept light from desired sources and to selectively reject light from undesired sources based upon different side or horizontally spaced locations of such light sources. For example, optical device 420 may be configured to attenuate light from a light source on the right to a greater extent as compared to from a desired light source on the left. At the same time, gain reflector 426 compensates for loss of brightness caused by modulator 424 and attenuator 422.

Although optical device 420 is illustrated as including attenuator 422 and gain reflector 426 which symmetrically attenuate light and symmetrically apply gain to light with respect to a vertical plane that is normal to attenuator 422, in other embodiments, attenuator 422 and gain reflector 426 may alternatively asymmetrically attenuate and asymmetrically apply gain to light in a fashion similar to that shown in FIGS. 4 and 6 with respect to the generally horizontally axis. Likewise, in other embodiments, gain reflector 426 may also be configured to steer reflected light in a sideways direction. Such sideways attenuation and gain application illustrated in FIG. 8 may likewise be performed by optical devices 120, 220 and 320 shown and described with respect to FIGS. 2, 3 and 4.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An optical device comprising:
    a first layer configured to attenuate light based upon angles of incidence of the light with the first layer; and
    a second layer configured to reflect and apply gain to the light, wherein the first layer is further configured to asymmetrically attenuate the light with respect to a normal angle of incidence with the first layer; and
    a third layer between the first layer and the second layer, the third layer configured to change between a first light transmissive state and a second lesser light transmissive state, wherein the second layer includes:
    a holographic diffuser; and
    a reflective metal layer adjacent to holographic diffuser upon either side of the holographic diffuser, wherein the reflective metal layer is configured to be connected to a current or voltage source to create varying electric field across the third layer.

2. The device of claim 1, wherein the second layer is further configured to steer reflection of the light in a direction non-perpendicular to the second layer.

3. The device of claim 2, wherein the second layer is configured to non-uniformly apply gain to the light based upon angles of incidence with the second layer.

4. The device of claim 3, wherein the second layer is further configured to asymmetrically apply gain to the light with respect to a normal angle of incidence.

5. The device of claim 1, wherein the second layer is configured to non-uniformly apply gain to the light based upon angles of incidence with the second layer.

6. The device of claim 5, wherein the second layer is further configured to asymmetrically apply gain to the light with respect to a normal angle of incidence.

7. The device of claim 1, wherein the first layer is configured to non-uniformly attenuate light based on an angle of incidence with respect to a horizontal plane that is normal to the first layer and wherein the second layer is configured to nonuniformly apply gain to the light based upon an angle of incidence of such light with respect to a vertical plane that is normal to the second layer.

8. The device of claim 1, wherein the third layer comprises a dyed polymer-dispersed liquid crystal.

9. The device of claim 1, wherein the second layer includes red, green and blue reflective portions.

10. The device of claim 1, wherein the first layer is a privacy filter.

11. The device of claim 1, wherein the second layer includes an image.

12. An optical device comprising:
    a first layer configured to attenuate light based upon angles of incidence of the light with the first layer; and
    a second layer configured to reflect and apply gain to the light, wherein the first layer is configured to asymmetrically attenuate light based on an angle of incidence with respect to a horizontal plane that is normal to the first layer and wherein the second layer is configured to asymmetrically apply gain to the light based upon an angle of incidence of such light with respect to a vertical plane that is normal to the second layer.

13. The device of claim 1 further comprising the current or voltage source electrically connected to the reflective metal layer.

* * * * *